United States Patent
Parkvall et al.

(10) Patent No.: US 10,999,824 B2
(45) Date of Patent: May 4, 2021

(54) METHODS AND APPARATUSES FOR HANDLING OF RETRANSMISSION FEEDBACK

(71) Applicant: Telefonaktiebolaget LM Ericsson (publ), Stockholm (SE)

(72) Inventors: Stefan Parkvall, Bromma (SE); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/335,007

(22) PCT Filed: Sep. 25, 2017

(86) PCT No.: PCT/SE2017/050928
§ 371 (c)(1),
(2) Date: Mar. 20, 2019

(87) PCT Pub. No.: WO2018/063059
PCT Pub. Date: Apr. 5, 2018

(65) Prior Publication Data
US 2020/0120663 A1  Apr. 16, 2020

Related U.S. Application Data

(60) Provisional application No. 62/402,266, filed on Sep. 30, 2016.

(51) Int. Cl.
*H04W 72/04* (2009.01)
*H04L 1/18* (2006.01)

(52) U.S. Cl.
CPC ....... *H04W 72/0413* (2013.01); *H04L 1/1861* (2013.01); *H04L 1/1893* (2013.01); *H04W 72/044* (2013.01)

(58) Field of Classification Search
CPC ............. H04W 72/04; H04W 72/0406; H04W 72/0413; H04W 72/042; H04W 72/044;
(Continued)

(56) References Cited

U.S. PATENT DOCUMENTS 10,070,418 B2* 9/2018 Liu .................. H04W 72/0406
2008/0008126 A1* 1/2008 Shirakabe ............ H04B 7/2615
370/329

(Continued)

FOREIGN PATENT DOCUMENTS

WO  2014048509 A1  4/2014

OTHER PUBLICATIONS

3GPP, "3rd Generation Partnership Project; Technical Specification Group Radio Access Network; Evolved Universal Terrestrial Radio Access (E-UTRA); Physical layer; Measurements (Release 13)", 3GPP TS 36.214 V13.4.0, Dec. 2016, 1-21.

(Continued)

*Primary Examiner* — Kevin D Mew
(74) *Attorney, Agent, or Firm* — Murphy, Bilak & Homiller, PLLC

(57) ABSTRACT

There is disclosed a method of operating a User equipment, UE, in a cellular communications network. The method comprises receiving a data on a Downlink, DL, time-frequency resource, and transmitting on an Uplink, UL, time-frequency resource, a retransmission feedback to indicate whether a data packet, comprised in the data, was received properly, wherein the UL time-frequency resource is determined based on the DL time-frequency resource. The disclosure also pertains to related methods and devices.

18 Claims, 10 Drawing Sheets

Including the time relation when computing the resources to use for the acknowledgements.

(58) Field of Classification Search
CPC .......... H04W 72/0446; H04W 72/0453; H04L 1/1861; H04L 1/1864; H04L 1/1893; H04L 1/1896

See application file for complete search history.

(56) References Cited

U.S. PATENT DOCUMENTS

| | | | | |
|---|---|---|---|---|
| 2008/0095109 A1* | 4/2008 | Malladi | ................ | H04L 1/1858 370/330 |
| 2011/0150049 A1* | 6/2011 | Dent | .................... | H04L 5/0057 375/219 |
| 2011/0194516 A1* | 8/2011 | Aiba | ..................... | H04L 1/0026 370/329 |
| 2011/0261679 A1* | 10/2011 | Li | ......................... | H04L 1/1854 370/216 |
| 2011/0299490 A1* | 12/2011 | Nordstrom | ............ | H04L 1/1861 370/329 |
| 2012/0099553 A1* | 4/2012 | Aiba | ...................... | H04L 5/001 370/329 |
| 2012/0113831 A1* | 5/2012 | Pelletier | ................ | H04L 5/0053 370/252 |
| 2012/0182949 A1* | 7/2012 | Aiba | ...................... | H04L 5/001 370/329 |
| 2013/0010721 A1* | 1/2013 | Aiba | ..................... | H04L 1/1812 370/329 |
| 2013/0100888 A1* | 4/2013 | Shimezawa | ........... | H04L 5/0053 370/328 |
| 2013/0336157 A1* | 12/2013 | Tidestav | ............... | H04W 28/06 370/252 |
| 2014/0146782 A1* | 5/2014 | Gerlach | ............. | H04W 72/042 370/329 |
| 2015/0103725 A1* | 4/2015 | Sun | ...................... | H04L 1/1861 370/312 |
| 2015/0208408 A1* | 7/2015 | Berggren | .............. | H04L 1/1861 370/329 |
| 2015/0327244 A1* | 11/2015 | Pajukoski | ............. | H04L 5/0003 370/330 |
| 2015/0349866 A1* | 12/2015 | Benjebbour | ........ | H04W 72/042 370/329 |
| 2015/0358976 A1* | 12/2015 | Rahman | .............. | H04W 72/082 370/280 |
| 2016/0021650 A1* | 1/2016 | Chembil-Palat | ...... | H04W 24/02 455/434 |
| 2016/0087706 A1* | 3/2016 | Guey | ...................... | H04L 5/005 375/267 |
| 2016/0192376 A1* | 6/2016 | Lee | ................... | H04W 72/0406 370/252 |
| 2016/0192388 A1* | 6/2016 | Ekpenyong | ....... | H04W 72/1284 370/329 |
| 2016/0205717 A1* | 7/2016 | Kazmi | .................... | H04W 8/22 455/435.2 |
| 2016/0219443 A1* | 7/2016 | Lee | ........................ | H04W 76/14 |
| 2016/0254892 A1* | 9/2016 | Kim | .................. | H04W 72/1268 370/280 |
| 2017/0041119 A1* | 2/2017 | Ang | ..................... | H04W 72/042 |
| 2017/0111886 A1* | 4/2017 | Kim | ..................... | H04W 48/14 |
| 2017/0134236 A1* | 5/2017 | Patel | ..................... | H04L 5/0044 |
| 2017/0181134 A1* | 6/2017 | Niu | ...................... | H04B 17/318 |
| 2018/0035446 A1* | 2/2018 | Li | ............................. | H04L 5/14 |
| 2018/0199335 A1* | 7/2018 | Jung | ..................... | H04L 1/1812 |

OTHER PUBLICATIONS

3GPP, "3rd Generation Partnership Project; Technical Specification Group Radio Access Network; Physical layer; Measurements (FDD) (Release 13)", 3GPP TS 25.215 V13.0.0, Dec. 2015, 1-25.

Unknown, Author, "Discussion on UL control channel structure for NR", 3GPP TSG RAN WG1 #86, R1-166756, Gothenburg, Sweden, Aug. 22-26, 2016, 1-3.

Unknown, Author, "HARQ feedback for sTTI scheduling", 3GPP TSG RAN WG1 Meeting #85, R1-164584, Nanjing, China, May 23-27, 2016, 1-3.

* cited by examiner

FIG. 1 Fast ACKNOWLEDGEMENT

Reduced switching overhead by transmitting multiple ACKs in a later slot.

When Acknowledgement resources only depend the DL data frequency resource and eedback is requested in same time structure, there is a risk for collisions of different ACKs.

Including the time relation when computing the resources to use for the acknowledgements.

Dynamic TDD

- receiving a data on a Downlink, DL, time-frequency resource,
- transmitting on an Uplink, UL, time-frequency resource, a retransmission feedback to indicate whether a data packet, comprised in the data, was received properly, wherein the UL time-frequency resource is determined based on the DL time-frequency resource.

- transmitting data on a on a Downlink, DL, time-frequency resource and

- receiving on an Uplink, UL, time-frequency resource, a retransmission feedback indicating whether the data packet was received properly, wherein the UL time-frequency resource is determined based on the DL time-frequency resource.

*FIG. 6b*

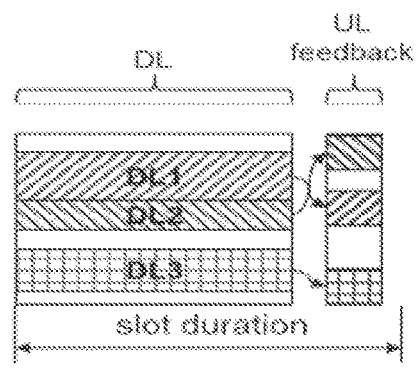
Fig 12: Multiple DL data Transmissions are scheduled within a slot and corresponding DL HARQ feedback is reported at the end of the same slot.
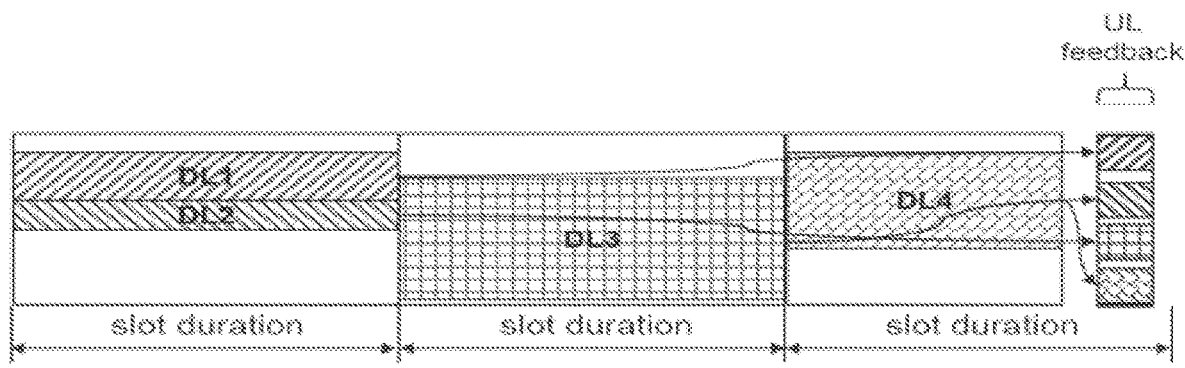
Fig 13: DL HARQ feedback for transmissions/receptions of several slots is reported in one slot.

METHODS AND APPARATUSES FOR HANDLING OF RETRANSMISSION FEEDBACK

TECHNICAL FIELD

Embodiments herein relate to telecommunications and/or data communications in general and in particular to methods and apparatuses for controlling feedback transmissions when Automatic Repeat Request- (ARQ) and/or Hybrid Automatic Repeat Request (HARQ) re-transmission schemes are used.

BACKGROUND

Modern wireless communication systems use re-transmission schemes, often denoted as Automatic Repeat Request (ARQ). In an ARQ scheme a data packet, transmitted from a transmitter, is appended with a CRC. A receiver decodes the data packet, re-calculates the CRC and compares the obtained CRC with the transmitted CRC. If the CRC matches, an acknowledgement (ACK) is sent as feedback to the transmitter to indicate that the corresponding data packet was received correctly, otherwise a negative acknowledgment (NACK) is sent as feedback to the transmitter to indicate that the data packet was not received correctly. Based on such feedback (ACK or NACK) the transmitter can retransmit the corresponding data packet if the feedback was a NACK.

In case the feedback is a NACK, the time for successful data transmission is at least the time required for providing the feedback and to re-transmit the data from the transmitter. The time duration between a transmission and a consecutive re-transmission may be called a re-transmission round trip time.

In LTE and other wireless communication systems, both FEC (Forward Error Correction) encoding and ARQ may be applied, this is also known as Hybrid ARQ (HARQ). HARQ may also be used in HSDPA and HSUPA which provide high speed data transmission (on downlink and uplink, respectively) for mobile phone networks such as UMTS, and in the IEEE 802.16-2005 standard for mobile broadband wireless access, also known as "mobile WiMAX". It is also used in EVDO and LTE based wireless networks as well as 5G New Radio.

Recently, the 3GPP Technical Specifications Groups has agreed on a work plan that includes a specification of Next Generation (NexGen) architecture and specification of the 5G New Radio (NR).

Transmissions in NR will most likely deploy a time structure in terms of slots and mini-slots.
  Slots may e.g. comprise an integer number N of OFDM symbols in duration and can only start at every N:th OFDM symbol.
  Mini-slots may comprise less than an N OFDM symbols in duration and can start at any OFDM symbol, or at least more often than every N:th OFDM symbol.
  Dynamic TDD will be supported for NR. In dynamic TDD, time resources, such as e.g. slots and/or mini-slots, may not be predefined as uplink- or downlink-time resources in advance. Instead, the "transmission direction" and/or whether the time resource (slot and/or mini-slot) should be used for uplink (UL) or downlink (DL) may be determined by the scheduler in a network node (e.g. an eNB) as part of the dynamic scheduling decision and inform the receiver (e.g. a user equipment, UE) of the scheduling decision.

Downlink data transmissions to a UE may occupy one or more slots and/or mini-slots, where the first slot may be and/or comprise a mini-slot. Upon reception of downlink data, a User Equipment (UE) may try to decode the data and transmit feedback on the outcome in the form of a positive or negative acknowledgement (ACK or NACK). Such feedback may be named as retransmission feedback.

To achieve low latency it is preferable if the retransmission feedback occurs as soon as possible after the downlink data is received, as illustrated in FIG. 1. TDD is assumed in the figure, but the principle holds equally well for FDD.

Sending the acknowledgement after each received downlink slot (or set of slots) may result in unnecessary overhead from switching between uplink and downlink. In many cases where extremely low latency is not critical it could therefore be beneficial to transmit the retransmission feedback at a later point in time as shown in FIG. 2. However, by doing so, there are anticipated problems related to collisions of retransmission feedback on UL resources for transmission of HARQ/ARQ feedback, e.g., HARQ ACK/NACK.

SUMMARY

An object of examples herein is to alleviate the problem disclosed earlier. The object of examples herein comprises providing a method for a user equipment; a user equipment; a method for a network node and a network node.

Accordingly, in a first example, there is described a method of operating a user equipment, UE. The method comprises receiving a data on a Downlink, DL, time-frequency resource and transmitting on an Uplink, UL, time-frequency resource, a retransmission feedback to indicate whether a data packet, comprised in the data, was received properly. The UL time-frequency resource is determined based on the DL time-frequency resource.

There is also described a method of operating a network node. The method comprises transmitting a data on a Downlink, DL, time-frequency resource, to a User Equipment, UE and receiving on an Uplink, UL, time-frequency resource, a retransmission feedback indicating whether a data packet, comprised in the data, was received properly by the UE. The UL time-frequency resource is determined based on the DL time-frequency resource used for transmitting the data.

Moreover, a User equipment, UE, is described. The UE comprises one or more processors and a memory. The memory contains instructions executable by the one or more processors. When instructions are executed the UE is operative to receive a data on a Downlink, DL, time-frequency resource and transmit, on an Uplink, UL, time-frequency resource, a retransmission feedback to indicate whether a data packet, comprised in the data, was received properly, wherein the UL time-frequency resource is determined based on the DL time-frequency resource.

A network node is also proposed, the network node comprises one or more processors circuitry and a memory. The memory contains instructions executable by the one or more processors. When the instructions are executed the network node is operative to transmit a data on a Downlink, DL, time-frequency resource, to a User Equipment, UE, and receive on an Uplink, UL, time-frequency resource, a retransmission feedback indicating whether a data packet, comprised in the data, was received properly by the UE, wherein the UL time-frequency resource is determined based on the DL time-frequency resource.

An advantage with embodiments herein is that the transmission latency is reduced and that overload of transmission buffer is reduced. Additional advantages may be that a flexibility in providing UL resources for retransmission feedback is provided and that collisions when transmitting retransmission feedback can be avoided.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 6b is a chart illustrating the operation of a network node according to some embodiments of the present disclosure;

FIG. 12 illustrates multiple transmissions of data that are scheduled within a slot and corresponding DL HARQ feedback is reported at the end of the same slot.

FIG. 13 illustrates DL HARQ feedback for transmissions/receptions of several slots is reported in one slot.

DETAILED DESCRIPTION

Generalizations

Figure 1:
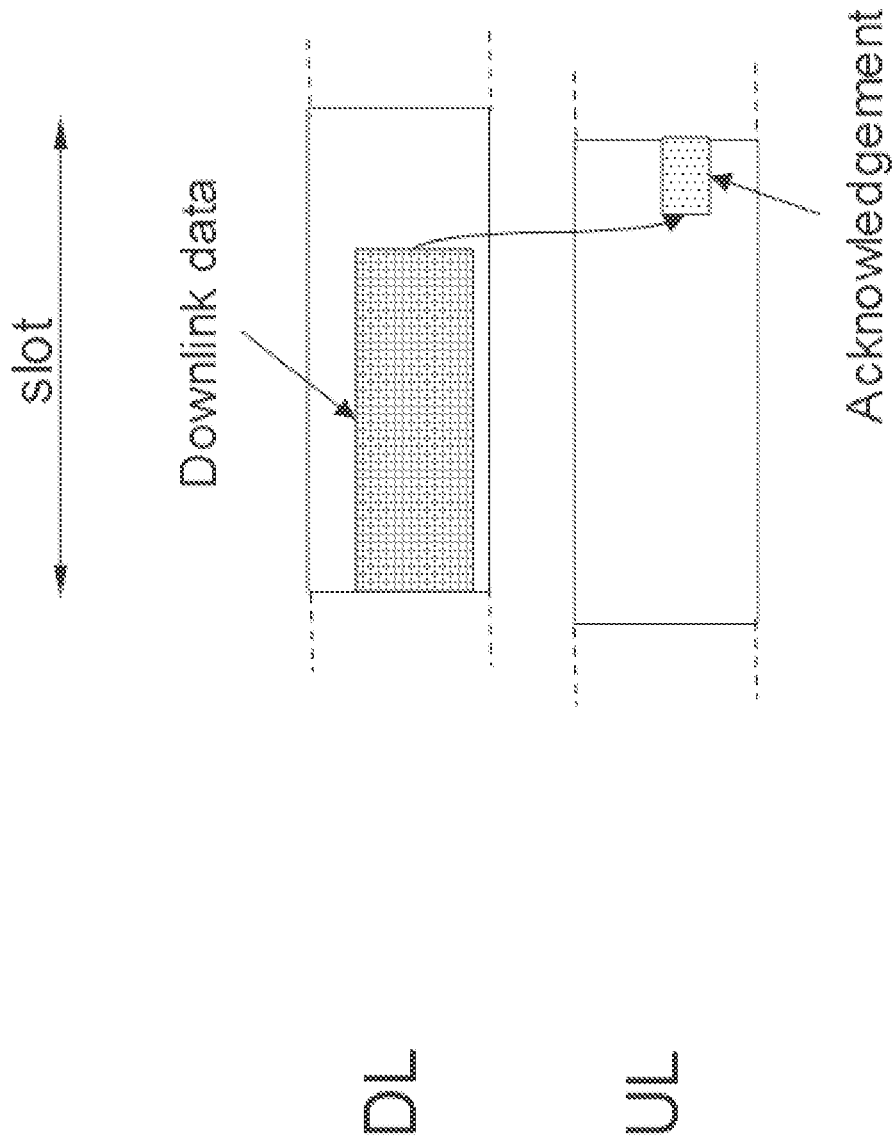
FIG. 1 illustrates an example of a fast ACKnowledgement and/or a fast retransmission feedback.
Figure 2:
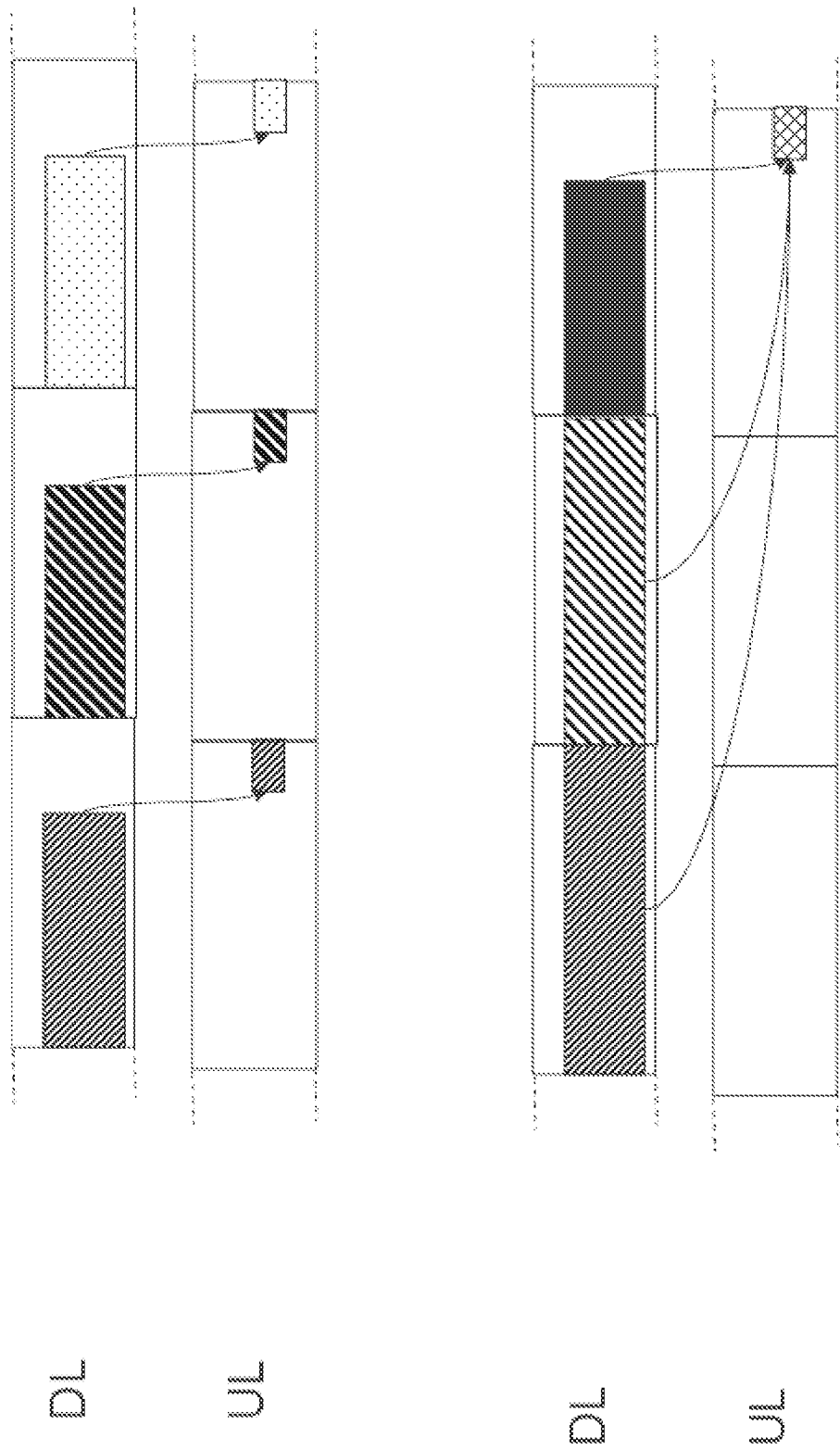
FIG. 2 illustrates reduced switching overhead by transmitting multiple ACKs in a later slot or time resource.

Any two or more embodiments described below may be combined in any way with each other.

In some embodiments a non-limiting term User Equipment (UE) is used. The UE herein can be any type of wireless device capable of communicating with a network node or another UE over radio signals. The UE may also be a radio communication device, a target device, a Device-to-Device (D2D) UE, a machine type UE, or a UE capable of Machine-to-Machine (M2M) communication, a sensor equipped with a UE, an iPAD, a tablet, a mobile terminal, a smart phone, Laptop Embedded Equipped (LEE), Laptop Mounted Equipment (LME), Universal Serial Bus (USB) dongles, Customer Premises Equipment (CPE), a relay, etc.

Also in some embodiments generic terminology, "radio network node", "radio node" or "network node," is used. It can be any kind of network node which may comprise a base station, a radio base station, a base transceiver station, a base station controller, a network controller, an enhanced or evolved Node B (eNB), a Node B, a gNodeB (gNB), Multi-cell/Multicast Coordination Entity (MCE), a relay node, an access point, a radio access point, a Remote Radio Unit (RRU) Remote Radio Head (RRH), a core network node (e.g., a Trace Collection Entity (TCE), a Mobility Management Entity (MME), a Minimization of Drive Tests (MDT) node, a Multimedia Broadcast/Multicast Service (MBMS) node), or even an external node (e.g., a third party node, a node external to the current network), etc.

The term 'radio node' used herein may be used to denote a UE or a radio network node.

The examples herein are applicable to single carrier as well as to multicarrier or Carrier Aggregation (CA) operation of the UE in which the UE is able to receive and/or transmit data to more than one serving cells. The term CA is also called (e.g., interchangeably called) "multi-carrier system," "multi-cell operation," "multi-carrier operation," and "multi-carrier" transmission and/or reception. In CA, one of the Component Carriers (CCs) is the Primary CC (PCC) or simply primary carrier or even anchor carrier. The remaining ones are called Secondary CCs (SCCs) or simply secondary carriers or even supplementary carriers. The serving cell is interchangeably called a Primary Cell (PCell) or Primary Serving Cell (PSC). Similarly the secondary serving cell is interchangeably called a Secondary Cell (SCell) or Secondary Serving Cell (SSC).

For the sake of consistency the term "slot" is used. Herein, a slot is applicable to any type of time resources. Non-limiting examples of time resources are symbol, OFDM symbol, time slot, mini-timeslot, interleaving duration or period, Transmission Time Interval (TTI), Reception Time Instance and/or Interval, scheduling duration or period, subframe, resource assignment period or duration, frame, radio frame etc. A time resource may comprise and/or be defined by a starting time instance and/or a time duration. A time duration for a time resource may be zero.

It should also be noted that in this disclosure, a time structure may represent e.g. a time resource and/or and allocation of time resources for Uplink, UL and/or Downlink, DL.

Also in some embodiments generic terminology UL resource and DL resource are used. An resource can be any kind of radio resource, such as e.g. a frequency resource and/or a time resource and/or a code resource. In particular, a combination of a time resource and a frequency resource may be called a time-frequency resource. An UL resource may e.g. refer to a resource used for transmission from e.g. a UE to be used for reception by e.g. a radio node in a cellular communications system. A DL resource may e.g. refer to a resource used for transmission from e.g. a network node in a cellular communications system to be used for reception by e.g. a UE.

Herein, a radio node activity may comprise, e.g., any operation or activity performed by e.g. a UE for receiving and/or transmitting one or more signals from and/or to a radio node and/or cell. Examples of operation or activity are performing one or more of: a measurement (e.g., any of the measurements specified in Technical Specification (TS) 36.214 or TS 25.215), a bunch of measurements (e.g., intra-frequency measurements for more than one cell, inter-frequency measurements over more than one carrier, etc.), Channel Quality Indication (CQI) reporting, Radio Link Monitoring (RLM), cell search, cell selection or reselection, handover, receiving a radio signal or channel or a physical signal, transmitting a radio signal or channel, etc. Specific examples of measurements are Reference Signal Received Power (RSRP), Reference Signal Received Quality (RSRQ), UE reception-transmission time difference, Reference Signal Time Difference (RSTD), Signal to Interference plus Noise Ratio (SINR), Signal to Noise Ratio (SNR), Cell Global Identifier (ID) (CGI) or Evolved Universal Terrestrial Radio Access (E-UTRA) CGI (ECGI) identification delay, Global System for Mobile Communications (GSM) carrier Received Signal Strength Indicator (RSSI), IEEE 802.11 Beacon RSSI, CPICH RSCP, Common Pilot Channel (CPICH) Ec/No, etc. Specific examples of channels are Physical Downlink Control Channel (PDCCH), Physical Downlink Shared Channel (PDSCH), Enhanced PDCCH (E-PDCCH), Machine Type Communication (MTC) PDCCH (M-PDCCH), MTC PDSCH (M-PDSCH), etc. Specific examples of physical signals are Reference Signals (RSs) like Discovery RSs (DRSs), Cell-Specific RSs (CRSs), Channel State Information RSs (CSI-RSs), Primary Synchronization Signal (PSS)/Secondary Synchronization Signal (SSS), etc.

Figure 7:
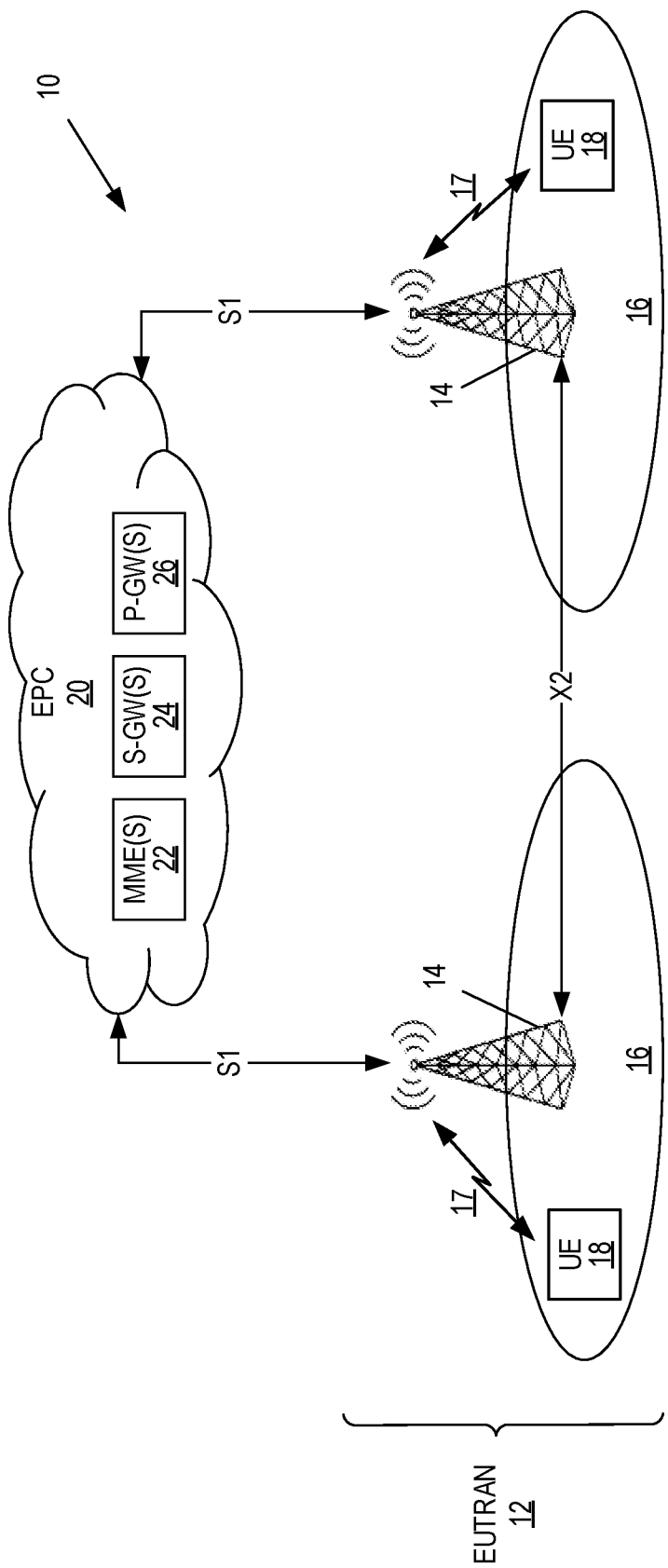
FIG. 7 illustrates one example of a cellular communications network.

In FIG. 7, an example of cellular communication system 10 is illustrated. A cellular communication system 10 may be any communication system using radio links 17 for communication, such as e.g. UMTS, LTE, GSM, CDMA2000, 5G, NR or a core network such as e.g. EPS or any combination of those.

A radio link 17 may e.g. connect two or more radio nodes and provide a radio communication service. A radio link may comprise a physical link and/or a logical link comprising one or more physical links. A radio link 17 may support the use of re-transmission schemes a such as ARQ and/or HARQ.

If a radio link 17 supports a retransmission scheme, the UE and/or network node can use retransmission feedback to indicate whether a data and/or data packet was received properly.

Herein, a data may pertain to a transmission and/or reception, by a radio node, using UL- and DL resources, such as e.g. UL- or DL-time-frequency resources. A data may additionally and/or alternatively comprise one or more data packets and/or transport blocks and/or Packet Data Units (PDU) or any other suitable data structure. Additionally, data may comprise any data transmitted and/or received using either UL- or DL time frequency resources. A data may comprise control information and/or user data. In particular a data packet may comprise only user data. Control information is generally associated with a data packet comprising user data in that control information may control a transmission and/or a reception of user data. User data may be transparent for communication transmission and/or reception over a radio link.

A transmission direction herein, generally relates to whether it is an UL- or DL transmission.

It shall be mentioned that a sidelink for communication between e.g. two or more UEs are examples of radio links. Such communication may be referred to as D2D- or V2X communication. In analogy to sidelink communication, one can consider a communication link between two or more network nodes (e.g. eNBs and/or gNBs). These latter links may be referred to as BS2BS links.

A cellular communications network may be operating by using dynamic TDD and/or dynamic assignment of transmission direction. As is known in the art, cellular communication networks may also operate by using other schemes, such as e.g static TDD, FDD, half-duplex FDD, full duplex FDD.

Example System Architecture

FIG. 7 illustrates one example of a cellular communications network 10 in which embodiments of the present disclosure can be implemented. As illustrated, the cellular communications network 10 includes a Radio Access Network (RAN) 12 (e.g., an Evolved Universal Mobile Telecommunications System (UMTS) Radio Access Network (E-UTRAN) for LTE or Next Generation (NexGen) architecture supporting 5G New Radio (NR)) including base stations 14 providing cells 16 of the cellular communications network 10. The base stations 14 provide radio access to UEs 18 located within the respective cells 16. The radio access is provided with radio links 17. The base stations 14 may be communicatively coupled via a base station to base station interface (e.g., an X2 interface in LTE). Further, the base stations 14 are connected to a core network 20 (e.g., an Evolved Packet Core (EPC) in LTE) via corresponding interfaces (e.g., 51 interfaces in LTE). The core network 20 includes various core network nodes such as, e.g., MMEs 22, Serving Gateways (S-GWs) 24, and Packet Data Network (PDN) Gateways (P-GWs) 26, as will be appreciated by one of ordinary skill in the art.

Generally, spectrum allocations in a RAN may be either paired or unpaired, where paired typically may be exploited using FDD and unpaired is generally deployed by using TDD. These allocation strategies are likely to remain also in for 5G and NR. However, unpaired spectrum allocations are increasingly common the higher the frequency band and consequently TDD is even more important than in previous generations, in particular for high frequencies and small-cell deployments.

Dynamic TDD

In LTE, the time structure and/or frame structure is designed with a more or less fixed uplink-downlink allocation of slots to be used for UL and DL. However, with an increased focus on small-cell deployments, the number of active users per cell may be small and the traffic variations larger than in a large cell. Some of the problematic interference scenarios in wide-area TDD are also less pronounced in local-area deployments. To better exploit the traffic variations, eIMTA was introduced to LTE. In short, the LTE design started with static TDD and later took steps in the direction of a more dynamic assignment of uplink/downlink resources.

Figures 5, 6A:
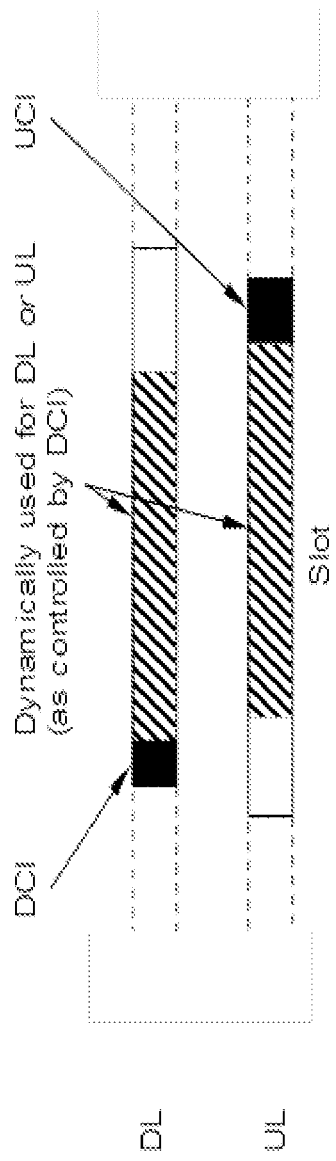
FIG. 5 illustrates Dynamic TDD.
FIG. 6a is a chart illustrating the operation of a user equipment according to some embodiments of the present disclosure.

For dynamic TDD, a part of a time resource (e.g. subframe and/or slot and/or min-slot) carrying data (or the whole subframe and/or slot) should be assignable to either uplink or downlink on a dynamic basis under the control of a scheduler as illustrated in FIG. 5. This allows better exploitation of the traffic dynamics in small-cell deployments. Operation in unlicensed spectrum also requires a dynamic TDD scheme; having a fixed uplink-downlink allocation of the time resource structure is clearly inferior in this case.

Dynamic signaling of the transmission direction does not require any specific means. The UE simply follows the scheduling assignments and grants received from the scheduler. The scheduler may transmit the scheduling assignments and grants by using control information and/or control data in a Downlink Control Information and/or Downlink Control Indicator (DCI).

If a downlink assignment is received for a certain time resource, the UE receives and processes the downlink data. Similarly, if an uplink grant is received and instructing the UE to transmit in a certain time resource, the UE does so. Indicating the transmission direction may be performed by means of e.g. a DCI on a time resource, such as slot and/or mini-slot and/or subframe basis. This is anticipated to have e.g. the following effects:

quick adaptation to traffic variations,
suitable choice for unlicensed spectrum.

Thus, it is important to already in the first release of NR support a fully dynamic scheme in order not to restrict future compatibility in later releases.

Clearly, dynamic assignment of the transmission direction is not relevant in all deployments, but in those cases the scheduling flexibility can be restricted as part of the implementation, possibly aided with various X2-like coordination messages. One example hereof is a macro TDD network with above-rooftop antennas where the inter-cell interference can be significant. This is also one of the scenarios where the complementary statement "NR supports at least semi-statically assigned DL/UL transmission direction as gNB operation" makes sense. On the other hand, in many high-carrier frequency deployments, and indoor and hot-spot scenarios with below-rooftop antennas the isolation is sufficient to allow for dynamic TDD operation. Operation in unlicensed spectrum is another example where there is no coordination of the interference between nodes and a dynamic scheme is suitable.

The DCI from the scheduler may comprise a feedback timing indicator, which indicates in which time resource the UE is supposed to transmit retransmission feedback related to a certain DL data from the network node. The feedback timing indicator may indicate e.g. that the UE shall transmit retransmission feedback in the same time resource (e.g. same slot) as in which it received the feedback timing indicator and/or data (so called Immediate ACK/NACK), or the feedback timing indicator may indicate that the UE shall transmit retransmission feedback in the next time resource, following the time resource, in which it received the feedback timing indicator and/or data. The feedback timing indicator may indicate any future time resource for the UE to transmit the retransmission feedback. An UL- and DL time resource may be considered the same if they are corresponding time resources in UL and DL. Corresponding time resources relates to time resources in UL and DL occurring "simultaneously" but with a time alignment to compensate for propagation delay. E.g. a starting point in time of time resource in DL, seen from a network node, will occur slightly earlier in the network node than in a UE receiving the transmission due to propagation delay of the transmission. Therefore the time resources in the UE occur slightly later, due to propagation delay, than the corresponding time resources in the network node. Reporting DL HARQ feedback at the end of the same slot pertains to a UE transmitting retransmission feedback for a data packet in a corresponding UL slot and/or time resource as in which the data packet was received by the UE.

The retransmission feedback transmitted by the UE may comprise feedback on one or more DL transmissions of e.g. data from the network. A DL transmission from the network herein, may relate to a transmission using one or more, DL time-frequency resources. A corresponding action in a UE would be to receive e.g. data on one or more DL time-frequency resources.

When using dynamic signaling of the transmission direction, some problems are anticipated in relation to UL transmission of retransmission feedback.

UL time-frequency resources are needed for transmitting the acknowledgement and/or retransmission feedback, in particular ACK/NACK for HARQ retransmission schemes. To reduce the control signaling overhead, these UL time-frequency resources can be derived from the frequency resources used for downlink data transmissions, such as DL transmissions of control and/or user data transmissions. This approach is used in LTE. In short, this approach gives the UL resource n, for the acknowledgement and/or retransmission feedback, as a function of the DL frequency resources used for the data DL transmission from the network node, e.g., n=f (DL_ctrl_freq_resource), wherein DL_ctrl_freq_resource may pertain to the frequency resources used for DL transmission of data.

Figure 3:
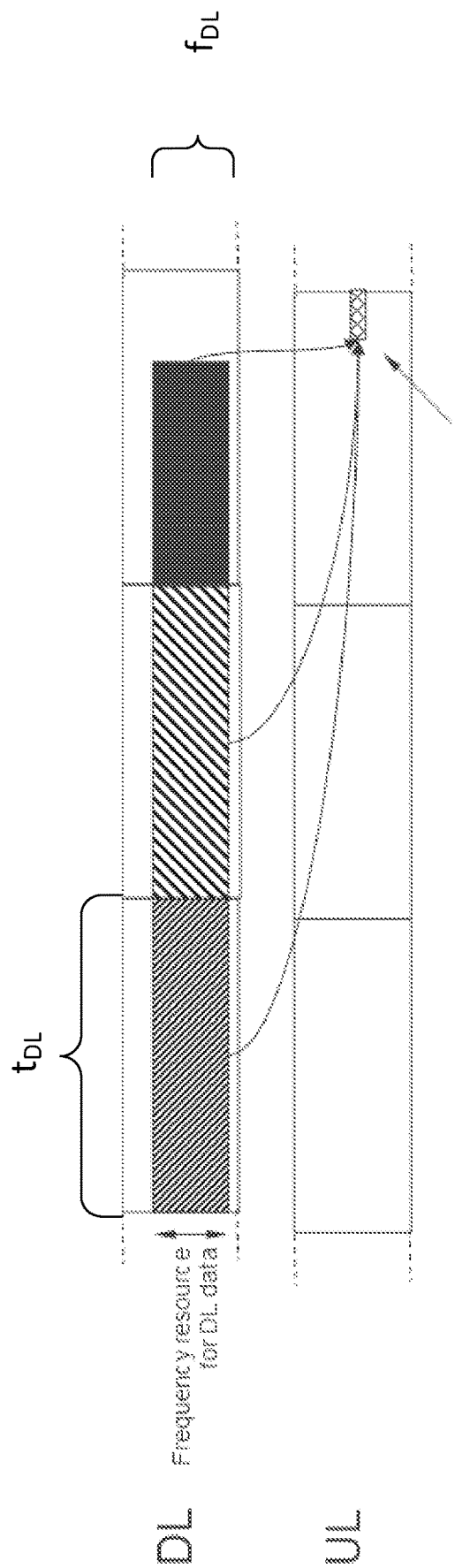
FIG. 3 illustrates that when retransmission feedback resources depend only on the frequency in the downlink data resource, it can result in collisions of different transmissions of retransmission feedback.

In case data in multiple slots and/or mini-slots are used for DL transmission and retransmission feedback, such as ACK/NACK, which may be requested by a feedback timing indicator, indicating that the retransmission is requested in future time-resource, but in the same time resource for all data in the multiple slots and/or mini-slots, it will not be possible to uniquely determine the UL resource by using the approach from LTE, which was described above. The reason is that the DL data in all three slots are transmitted on the same frequency. Consequently the UL resources would, if using the approach above, result in that the UL resources for retransmission feedback (ACK/NACK) would be allocated to the same UL resource and collide as illustrated in FIG. 3.

It is anticipated that not all terminals will be capable of reporting and/or transmitting HARQ feedback (such as e.g. ACK/NACK) at the end of the same slot or time resource as the data is received. HARQ feedback relating to multiple slots may therefore be reported in one slot. Even for terminals that may support HARQ feedback in the same slot or some resource it may be beneficial to use a later slot or time resource for transmitting feedback related to a data. FIG. 13 illustrates four DL data receptions and/or transmissions (DL1-DL4) for which feedback is not requested until the end of the third slot to avoid frequent switches between DL/UL. In this case an additional mechanism is needed that resolves UL resource conflicts from DL transmissions scheduled in different slots.

In this disclosure, a solution to the problem to avoid collisions between UL resources for transmitting retransmission feedback (e.g. HARQ ACK/NACK) to the network is provided. The solution may be applied in a cellular communications network as described above. Within a cellular communications network, similar problems may also be solved for transmissions between two UEs, which two UEs may be e.g. D2D devices communicating over a e.g. a sidelink as defined by 3GPP.

Figure 4:
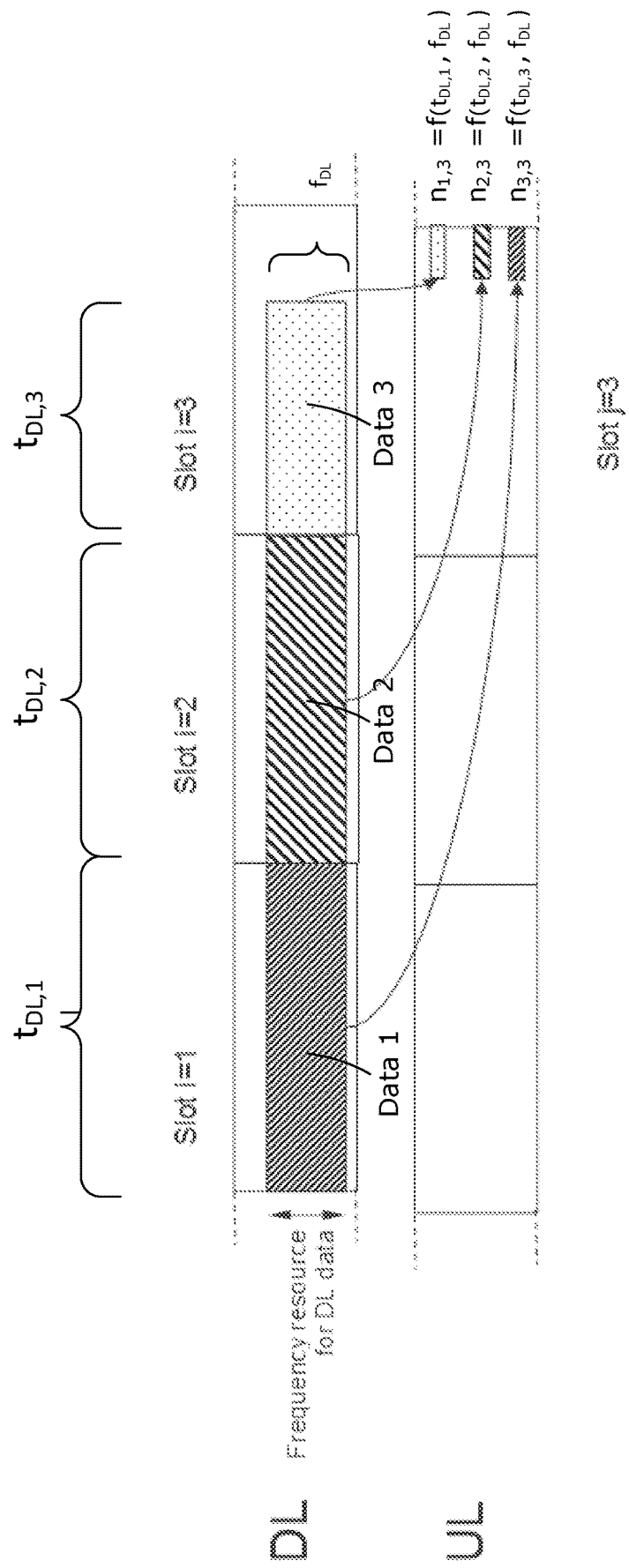
FIG. 4 illustrates an example of including the timing of a DL transmission, when determining the uplink resources to use for the retransmission feedback.

With reference to FIG. 4, a concept of the invention will first be described. Let $n_{i,j}$ denote the time-frequency resource to be used for transmission in uplink slot j of the retransmission feedback of the data received in downlink slot i (or ending in slot i in case of one transmission spanning multiple slots).

The DL- and/or UL time resources (slot i=1 or $t_{DL,1}$, slot i=2 or $t_{DL,2}$, slot i=3 or $t_{DL,3}$ and/or slot j=3) may be signaled from the scheduler in a network node to a UE in a DCI. In this particular case, slot j=3 (e.g. UL time resource to be used for HARQ ACK/NACK, $t_{UL}$) may be indicated by the feedback timing indicator described above.

The resource $n_{i,j}$ may alternatively or in addition be based on e.g a time indication of the received data. A time indication of the received data may comprise and/or represent a sequence number and/or starting time instance and/or a time duration and/or ending time instance, of:

the DL time resource (e.g. slot and/or subframe) that was used for transmitting (by e.g. a network node) the received data and/or the time resource, in particular a DL time resource (e.g. slot and/or subframe), that was used for receiving the data.

The resource $n_{i,j}$ may additionally and or alternatively, be based on a MIMO indication. A MIMO indication may pertain to and/or comprise e.g. an indication of a MU- MIMO streams and/or an indication of reference signals (demodulation reference signals, CSI reference signals or sounding reference signals) used for user equipments and/or an indication of any other reference signals used for the DL transmissions in a respective time resource, such as e.g. slot i.

The resource $n_{i,j}$, may represent an UL- and/or DL time-frequency resource.

Additionally or optionally, when using this concept, the resource $n_{i,j}$, (e.g. the UL time-frequency resource) may be based on DCI and/or a scheduling request and/or a DL Assignment and/or the feedback timing indicator.

Now turning to FIG. 6a, which illustrates a method in a UE. The method is disclosed by presenting an example of how to operate a UE when applying the above concept.

A method of operating a user equipment, UE, is disclosed. The method comprising:
  receiving a data on a Downlink, DL, time-frequency resource,
  transmitting on an Uplink, UL, time-frequency resource, a retransmission feedback to indicate whether a data packet, comprised in the data, was received properly, wherein the UL time-frequency resource is determined based on the DL time-frequency resource.

As an example the method may comprise transmitting (100), using an UL resource, a retransmission feedback (ACK/NACK) relating to a received data, wherein the UL resource $(n_{i,j})$ is based on a time indication (e.g. TTI and/or duration and/or staring time point of a time resource) of the received data (e.g. a DL time resource). In this example if a received data is received in e.g. a slot x, with starting point p and duration t, the UL resource may be determined as a function of x and/or p and/or t, so that the determined UL resource=f(x,p,t). With reference to FIG. 4, which illustrates DL resources $(t_{DL}, f_{DL})$ used for reception of data (Data 1-3) by a UE. Referring to slot x above, in FIG. 4 it is represented by slot i. In FIG. 4, it is also illustrated that data (Data 1-3) is received on three different DL time-frequency resources:
  Data 1 is received on time-frequency resource slot i=1 $(t_{DL,1})$ and frequency resource for DL data $(f_{DL})$
  Data 2 is received on time-frequency resource slot i=2 $(t_{DL,2})$ and frequency resource for DL data $(f_{DL})$
  Data 3 is received on time-frequency resource slot i=3 $(t_{DL,3})$ and frequency resource for DL data $(f_{DL})$ Further in FIG. 4, it is illustrated that UL resources used for transmitting retransmission feedback $(n_{1,3}, n_{2,3}, n_{3,3})$ are determined based on the DL resources used for reception of the data, to avoid collision.

Generally, it is disclosed that a UL time-frequency resource, used for transmission of retransmission feedback to a data, is determined based on a DL time-frequency resource used for receiving the data. In particular the UL frequency resource may be based on the DL time resource used for receiving the data.

In the above example, the frequency resource of the UL time-frequency resource used for transmission of retransmission feedback related to a data, is determined by the time resource of the DL time frequency resource used for receiving the data. However, it should be mentioned that the method could, additionally and/or alternatively use the DL frequency resources used for receiving the data, as a basis for determining the UL time-frequency resource, to use for transmission of retransmission feedback for the data. This would apart from previously mentioned advantages, further increase flexibility in usage and/or scheduling of UL resources for transmitting e.g. HARQ feedback.

In one exemplary aspect, there is disclosed a method of operating a user equipment, the method comprising:
  receiving a data on a Downlink, DL, time-frequency resource,
  transmitting on an Uplink, UL, time-frequency resource, a retransmission feedback to indicate whether a data packet, comprised in the data, was received properly, wherein the UL time-frequency resource is determined based on the DL time-frequency resource.

Receiving data on a DL time-frequency resource according to the method, may refer to a UE receiving data, which is transmitted by a network node in e.g. a time-frequency resource denoted $t_{DL}$ and $f_{DL}$, wherein $t_{DL}$ represents a specific time resource (e.g. a transmission time interval such as a slot or a mini-slot or a sub-frame) and $f_{DL}$ represents a specific frequency resource (e.g. a number of sub-carriers and/or a frequency bandwidth associated with a position in the frequency carrier used for communication) used for transmission of the data.

Transmitting a retransmission feedback, using an UL time-frequency resource, wherein the UL time-frequency resource is determined based on the DL time-frequency resource, may pertain to a UE transmitting a HARQ ACK or a HARQ NACK, on an UL time-frequency resource which is determined based on e.g. $t_{DL}$ and/or $f_{DL}$. Alternatively, one could say that the UL time-frequency resources $(t_{UL}, f_{UL})$ or $n_{i,j}$, are determined as a function of $t_{DL}$ and/or $f_{DL}$, and can be expressed as $n_{i,j}=f(t_{DL}, f_{DL})$ as is indicated in FIG. 4, which shows that the same frequency resources (e.g. $f_{DL}$) may be used in different DL time resources ($t_{DL}$, such as slot i=1, slot i=2 and slot i=3 or $t_{DL,1}$, $t_{DL,2}$ and $t_{DL,3}$). In FIG. 4, it is illustrated how the DL time frequency resources are used for determination of the UL time-frequency resources $(n_{i,j})$, in particular how the UL frequency resources used for transmission of retransmission feedback are determined based on the DL time resources ($t_{DL}$) used for receiving a data packet.

A time-frequency resources may be represented as a time resource associated with a frequency resource. Further, determining an UL time-frequency resource based on a DL time-frequency resource may refer to determining the UL time- and/or the associated frequency resource based on the DL time resource and/or the associated DL frequency resource.

By using the above method, the determined UL resource may therefore be uniquely defined in terms of UL time-frequency resources. Additionally, the UL resource may also be determined based on a frequency resource, such as e.g. a subcarrier and/or carrier, c, used for transmission and/or reception of the received data. In such a scenario, the determined UL resource may be determined as, f(x,p,t,c). The determined UL resource may be used for transmission of an ACK/NACK relating to the received data, which could reflect whether the UE has received the data correctly or not, without or with reduced risk for collision with other transmissions of retransmission feedback related to other receptions of data packets, e.g. transmissions of retransmission feedback by other UEs.

Additionally and/or alternatively, when using this concept in the method for operating a UE, the UL resource $(n_{i,j})$ may optionally and/or additionally be based on DCI and/or a scheduling request and/or a DL Assignment and/or a feedback timing indicator comprised in the DCI and/or resources on which DL control information associated with the data is received by the UE. Examples of such resources are DL time-frequency resources used for receiving e.g. scheduling requests and/or downlink assignments.

DCI, scheduling request and DL assignment are examples of control information associated with a data and/or user data.

In other words, in an aspect of the exemplary method in the UE the UL time-frequency resource may additionally and/or alternatively, further be determined based on one or more of:
Downlink Control Information, DCI
a scheduling request, SR
DL assignment, or
feedback timing indicator comprised in the DCI
IMO indication In yet another aspect of the method for operating a UE the received data may comprise a data packet received on a first part of the DL time-frequency resource and a control information associated with the data packet, wherein the control information is received on a second part of the DL time-frequency resource. In this aspect of operating the UE, the UL time-frequency resource, to use for transmitting a retransmission feedback for the received user data, is determined based on the second part of the DL time-frequency resource. Since it is estimated that a number of UEs using time-frequency resources for user data, is greater than the number of UEs using time-frequency resources for control information, resource conflict resolution for retransmission feedback resources is simplified.

In some aspects of the method of operating a UE, the control information is on one or more of:
Downlink Control Information, DCI
a scheduling request, SR
a DL assignment, or
a feedback timing indicator comprised in the DCI
a MIMO indication E.g., a UE may be configured with UL resources to use for a SR. If the UE needs to transmit an ACK/NACK and a SR simultaneously, the UE may e.g. use the configured resource for SR when transmitting the ACK/NACK. However, in case the UE does not use the SR, it may transmit the ACK/NACK using other resources. Based on the used resources, the network node (e.g. a gNB) can determine whether the UE transmits an SR.

In a further aspect of the method, it may optionally and/or additionally be carried out in a cellular communications network using dynamic TDD and/or dynamic assignment of transmission direction.

In yet another aspect the method for operating a UE may also comprise that the UL resource $(n_{t,j})$ is optionally based on a MIMO indication and/or resources used for receiving a MIMO indication. A MIMO indication may pertain to and/or comprise e.g. an indication of MU-MIMO streams and/or an indication of reference signals (demodulation reference signals, CSI reference signals or sounding reference signals) used for user equipments and/or an indication of any other reference signals and/or a precoder and/or antenna ports used for the DL transmissions in a respective time resource, such as e.g. slot i.

In an additional aspect the method for operating the UE it is considered that the time resource of the UL time-frequency resource and the time resource of the DL time-frequency resource are overlapping. This may be indicated in the control information associated with the data.

Now turning to how the concept is applied in a User Equipment. There is proposed a User Equipment, UE, comprising one or more processors and a memory, said memory containing instructions executable by said one or more processors, whereby said UE is operative to receive a data on a Downlink, DL, time-frequency resource, and transmit, on an Uplink, UL, time-frequency resource, a retransmission feedback to indicate whether a data packet, comprised in the data, was received properly, wherein the UL time-frequency resource is determined based on the DL time-frequency resource.

In another aspect of the proposed UE, the frequency resource of the UL time-frequency resource may be determined based on the time resource of the DL time-frequency resource.

In a further aspect of the UE, the data may comprise a control information associated with the data packet and the data packet may be received using a first part of the DL time-frequency resource and the control information may be received on a second part of the DL time-frequency resource.

In yet another aspect of the UE, the UL time-frequency resource may be determined based on the second part of the DL time-frequency resource.

In an additional and/or optional another aspect of the UE, the UL time-frequency resource may be determined based on the first part of the DL time-frequency resource.

In a further aspect of the UE, the control information may be on one or more of a Downlink Control Information, DCI, a scheduling request, SR, a DL assignment, a feedback timing indicator comprised in the DCI or a MIMO indication.

In an additional aspect of the UE it is considered that the time resource of the UL time-frequency resource and the time resource of the DL time-frequency resource are overlapping. This may be indicated in the control information associated with the data.

Now turning to how the concept may be applied in a network node, which is briefly illustrated in FIG. 6b.

FIG. 6b illustrates a method of operating a network node. The method comprises transmitting a data on a Downlink, DL, time-frequency resource, to a User Equipment, UE, and receiving on an Uplink, UL, time-frequency resource, a retransmission feedback indicating whether a data packet, comprised in the data, was received properly by the UE, wherein the UL time-frequency resource is determined based on the DL time-frequency resource.

For this method the frequency resource of the UL time-frequency resource may be determined based on the time resource of the DL time-frequency resource.

In an optional and/or additional aspect of this method, the data may comprise a control information associated with the data packet and the data packet is transmitted using a first part of the DL time-frequency resource and the control information is transmitted on a second part of the DL time-frequency resource.

Additionally and/or optionally, the UL time-frequency resource, in the network node method, is determined based on the second part of the DL time-frequency resource.

Additionally and/or optionally, the UL time-frequency resource, in the network node method, is determined based on the first part of the DL time-frequency resource.

In the method in the network node, the control information may be one or more of a Downlink Control Information, DCI, a scheduling request, SR, a DL assignment, a feedback timing indicator comprised in the DCI or a MIMO indication.

The method for operating a network node may additionally comprise retransmitting (200) a transmitted DL data based on retransmission feedback (ACK/NACK) received using an UL resource, wherein the UL resource may be determined in analogy with how the UE determines the UL resource for transmission of retransmission feedback (ACK/

NACK). In other words the network node may determine the UL resource ($n_{i,j}$) based on time indication of the DL resource used for the transmitted DL data. Optionally and/or additionally the network node may receive retransmission feedback relating to transmitted DL data on a UL resource, wherein the UL resource is determined, based on a time indication of the DL resource used for the transmitted DL data.

In an optional example of the method, the UL resource ($n_{i,j}$) may also be determined based on a frequency resource, such as e.g. a subcarrier and/or carrier, c, used for transmission and/or reception of the transmitted DL data. In such a scenario, the determined UL resource may be determined as, f(x,p,t,c). The determined UL resource may be used by the network node, to receive retransmission feedback, such as e.g. an HARQ ACK/NACK relating to the transmitted DL data, which retransmission feedback may indicate whether the UE has received the data correctly or not, without or with reduced risk for collision with.

In another aspect, the method may optionally comprise that the cellular communications network is operating by using dynamic TDD and/or dynamic assignment of transmission direction.

In another example of the method, the UL resource ($n_{i,j}$) may optionally be based on DL resources used for control information transmitted in relation to and/or associated with a data packet comprised in the data. Such control information may e.g. be DCI and/or a scheduling request and/or a DL Assignment and/or a feedback timing indicator comprised in the DCI. The method for operating the network node may optionally comprise transmitting the DCI. Transmitting the DCI may optionally be comprised in transmitting a scheduling request or a DL assignment.

In yet another example of the method for operating the network node, the UL resource ($n_{i,j}$) is optionally based on a MIMO indication and/or resources used for receiving a MIMO indication, wherein a MIMO indication may pertain to and/or comprise e.g. an indication of MU-MIMO streams and/or an indication of reference signals (demodulation reference signals, CSI reference signals or sounding reference signals) used for user equipments and/or an indication of any other reference signals and/or a precoder and/or antenna ports used for the DL transmissions in a respective time resource, such as e.g. slot i.

In an additional aspect the method for operating the network node, it is considered that the time resource of the UL time-frequency resource and the time resource of the DL time-frequency resource are overlapping. This may be indicated in the control information associated with the data.

Now turning to how the concept is applied in a Network node. There is proposed a network node comprising one or more processors and a memory, said memory containing instructions executable by said one or more processors, whereby said network node is operative to—transmit a data on a Downlink, DL, time-frequency resource, to a User Equipment, UE, and receive on an Uplink, UL, time-frequency resource, a retransmission feedback indicating whether a data packet, comprised in the data, was received properly by the UE, wherein the UL time-frequency resource is determined based on the DL time-frequency resource.

In another aspect of the proposed network node, the frequency resource of the UL time-frequency resource may be determined based on the time resource of the DL time-frequency resource.

In a further aspect of the network node, the data may comprise a control information associated with the data packet and the data packet may be received using a first part of the DL time-frequency resource and the control information may be transmitted on a second part of the DL time-frequency resource.

In yet another aspect of the network node, the UL time-frequency resource may be determined based on the second part of the DL time-frequency resource.

In an additional and/or optional another aspect of the network node, the UL time-frequency resource may be determined based on the first part of the DL time-frequency resource.

In a further aspect of the network node, the control information may be on one or more of a Downlink Control Information, DCI, a scheduling request, SR, a DL assignment, a feedback timing indicator comprised in the DCI or a MIMO indication.

In an additional aspect of the network node, it is considered that the time resource of the UL time-frequency resource and the time resource of the DL time-frequency resource are overlapping. This may be indicated in the control information associated with the data.

While various examples are described herein, some exemplary embodiments are as follows.

Example 1

A method for operating a user equipment, UE, in a cellular communications network, comprising:
transmitting, using an uplink, UL, resource ($n_{i,j}$), retransmission feedback relating to received data, wherein the UL resource is based on a time indication of the received data.

Example 2

The method of example 1 wherein the UL resource ($n_{i,j}$) is optionally based on DCI and/or a scheduling request and/or a DL Assignment and/or a feedback timing indicator comprised in the DCI. DCI and/or a scheduling request and/or a DL Assignment may be received from a network node.

Example 3

The method of example 1 or 2 wherein the UL resource ($n_{i,j}$) is further optionally based on a frequency resource, such as e.g. a subcarrier and/or carrier, c, used for transmission and/or reception of the received data.

Example 4

The method of example 1 to 3, wherein the operation comprises dynamic TDD and/or dynamic assignment of transmission direction.

Example 5

The method of example 1 to 4, wherein the UL resource ($n_{i,j}$) is optionally based on a MIMO indication, wherein a MIMO indication may pertain to and/or comprise e.g. an indication of MU-MIMO streams and/or an indication of reference signals (demodulation reference signals, CSI reference signals or sounding reference signals) used for user equipments and/or an indication of any other reference signals and/or a precoder and/or antenna ports used for the DL transmissions in a respective time resource, such as e.g. slot i.

Example 6

A method for operating a network node in a cellular communications network, comprising:
retransmitting a transmitted downlink, DL, data, based on information received in an uplink, UL, resource, wherein the UL resource is based on a time indication of the DL resource used for the transmitted DL data; and/or
receiving retransmission feedback relating to transmitted DL data on a UL resource, wherein the UL resource is determined, based on a time indication of the DL resource used for the transmitted DL data.

Example 7

The method of example 6, wherein the UL resource ($n_{i,j}$) is optionally based on DCI and/or a scheduling request and/or a DL Assignment and/or a feedback timing indicator comprised in the DCI. DCI and/or a scheduling request and/or a DL Assignment may be received from a network node.

Example 8

The method of any of examples 6 to 7, wherein the UL resource ($n_{i,j}$) may also be determined based on a frequency resource, such as e.g. a subcarrier and/or carrier, c, used for transmission and/or reception of the transmitted DL data.

Example 9

The method of any of examples 6 to 8, wherein the operation of the network node comprises dynamic TDD and/or dynamic assignment of transmission direction

Example 10

The method of any of examples 6 to 9, wherein the UL resource ($n_{i,j}$) is optionally based on a MIMO indication, wherein a MIMO indication may pertain to and/or comprise e.g. an indication of MU-MIMO streams and/or an indication of reference signals (demodulation reference signals, CSI reference signals or sounding reference signals) used for user equipments and/or an indication of any other reference signals and/or a precoder and/or antenna ports used for the DL transmissions in a respective time resource, such as e.g. slot i.

Example 11

A user equipment, UE, adapted to:
transmit, using an uplink, UL, resource ($n_{i,j}$), retransmission feedback relating to received data, wherein the UL resource is based on a time indication of the received data.

Example 12

The UE of example 11, wherein the UL resource ($n_{i,j}$) is optionally based on DCI and/or a scheduling request and/or a DL Assignment and/or a feedback timing indicator comprised in the DCI. DCI and/or a scheduling request and/or a DL Assignment may be received from a network node.

Example 13

The UE of example 11 or 12 wherein the UL resource ($n_{i,j}$) is further optionally based on a frequency resource, such as e.g. a subcarrier and/or carrier, c, used for transmission and/or reception of the received data.

Example 14

The UE of example 11 to 13, wherein the operation comprises dynamic TDD and/or dynamic assignment of transmission direction.

Example 15

The UE of example 11 to 14, wherein the UL resource ($n_{i,j}$) is optionally based on a MIMO indication, wherein a MIMO indication may pertain to and/or comprise e.g. an indication of MU-MIMO streams and/or an indication of reference signals (demodulation reference signals, CSI reference signals or sounding reference signals) used for user equipments and/or an indication of any other reference signals and/or a precoder and/or antenna ports used for the DL transmissions in a respective time resource, such as e.g. slot i.

Example 16

A network node, adapted to:
retransmit a transmitted downlink, DL, data, based on information received in an uplink, UL, resource, wherein the UL resource is based on a time indication of the DL resource used for the transmitted DL data; and/or
receive retransmission feedback relating to transmitted DL data on a UL resource, wherein the UL resource is determined, based on a time indication of the DL resource used for the transmitted DL data.

Example 17

The network node of example 16, wherein the UL resource ($n_{i,j}$) is optionally based on DCI and/or a scheduling request and/or a DL Assignment and/or a feedback timing indicator comprised in the DCI. DCI and/or a scheduling request and/or a DL Assignment may be received from a network node.

Example 18

The network node of any of examples 16 to 17, wherein the UL resource ($n_{i,j}$) may also be determined based on a frequency resource, such as e.g. a subcarrier and/or carrier, c, used for transmission and/or reception of the transmitted DL data.

Example 19

The network node of any of examples 16 to 18, wherein the operation of the network node comprises dynamic TDD and/or dynamic assignment of transmission direction

Example 20

The network node of any of examples 16 to 19, wherein the UL resource ($n_{i,j}$) is optionally based on a MIMO indication, wherein a MIMO indication may pertain to and/or comprise e.g. an indication of MU-MIMO streams and/or an indication of reference signals (demodulation reference signals, CSI reference signals or sounding reference signals) used for user equipments and/or an indication of any other reference signals and/or a precoder and/or antenna ports used for the DL transmissions in a respective time resource, such as e.g. slot i.

Figure 8:
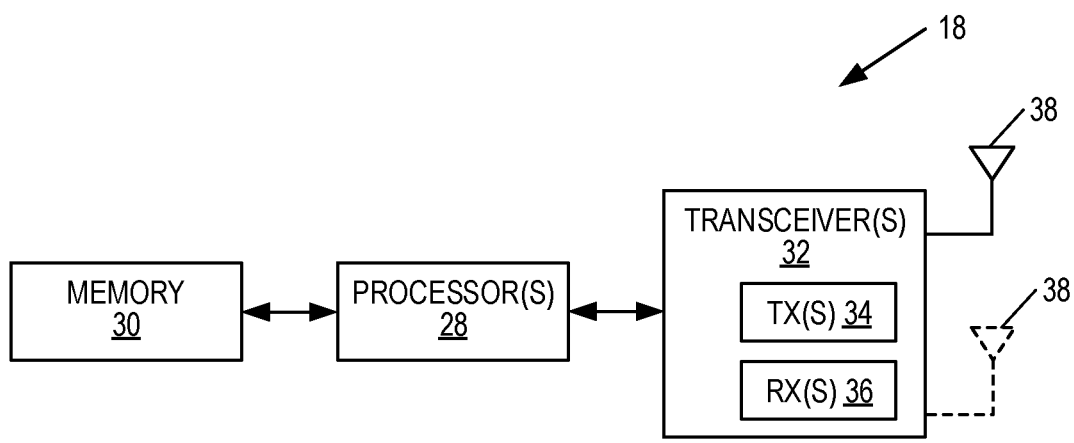
FIG. 8 is a block diagram of a User Equipment device (UE) according to some embodiments of the present disclosure.

FIG. 8 is a block diagram of the UE 18 according to some embodiments of the present disclosure. As illustrated, the UE 18 includes one or more processors 28 (e.g., one or more Central Processing Units (CPUs), one or more Application Specific Integrated Circuits (ASICs), one or more Field Programmable Gate Arrays (FPGAs), or the like, or any combination thereof), memory 30, and one or more transceivers 32 including one or more transmitters 34 and one or more receivers 36 coupled to one or more antennas 38. In some embodiments, the functionality of the UE 18 described herein is implemented in software, which is stored in the memory 30 and executed by the processor(s) 28.

In some examples, a computer program including instructions which, when executed by at least one processor, causes the at least one processor to carry out the functionality of the UE 18 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 30).

Figure 9:
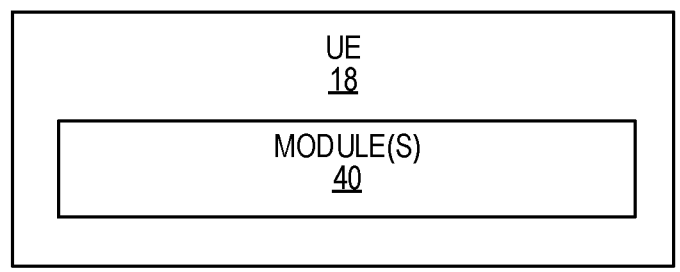
FIG. 9 is a block diagram of a UE according to some other embodiments of the present disclosure.

FIG. 9 is a block diagram of the UE 18 according to some other embodiments of the present disclosure. As illustrated, the UE 18 includes one or more modules 40, each of which is implemented in software. The module(s) 40 operate to provide the functionality of the UE 18 according to any of the embodiments described above with respect to FIG. 6a or 6b FIG. 10 is a block diagram of the base station 14 according to some embodiments of the present disclosure. As illustrated, the base station 14 includes a baseband unit 46 that includes one or more processors 48 (e.g., one or more CPUs, one or more ASICs, one or more FPGAs, and/or the like, or any combination thereof), memory 50, and a network interface 52 (e.g., a network interface providing a connection to the core network 20 and/or other base stations 14). The base station 14 also includes one or more radio units 54 including one or more transmitters 56 and one or more receivers 58 connected to one or more antennas 60. In some embodiments, the functionality of the network node described herein is implemented in software, which is stored in the memory 50 and executed by the processor(s) 48.

Figure 10:
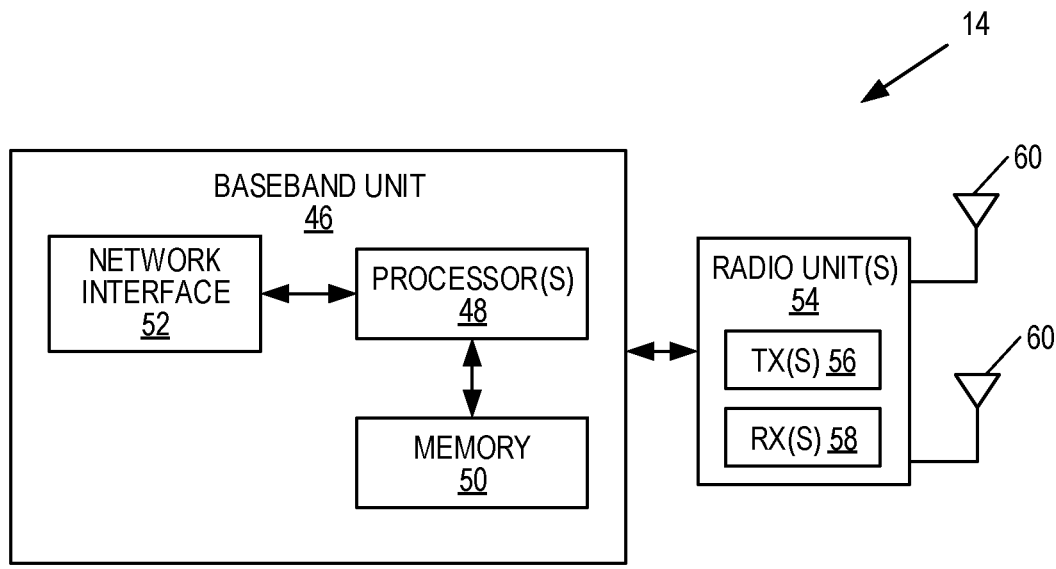
FIG. 10 is a block diagram of a network node according to some embodiments of the present disclosure.

Note that other network nodes may include components similar to those of the baseband unit 46 illustrated in FIG. 10.

In some embodiments, a computer program including instructions which, when executed by at least one processor, causes the at least one processor to carry out the functionality of the network node (e.g., the base station 14) according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 50).

Figure 11:
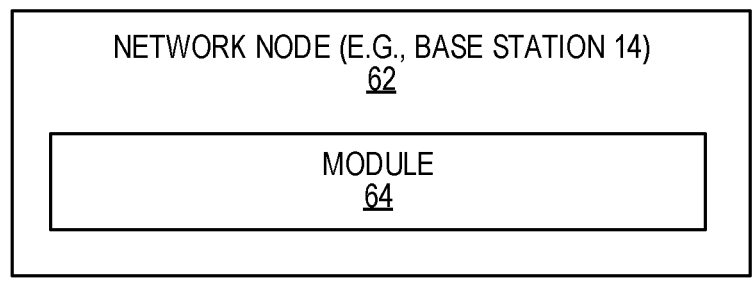
FIG. 11 is a block diagram of a network node according to some embodiments of the present disclosure.

FIG. 11 is a block diagram of a network node 62 (e.g., the base station 14) according to some other embodiments of the present disclosure. As illustrated, the network node 62 includes one or more modules 64, each of which is implemented in software. The module(s) 64 operate to provide the functionality of the network node 62 according to any of the embodiments described above with respect to FIG. 6a or 6b.

It should also be mentioned that the embodiments herein may be implemented through one or more processors or processing units e.g. processing circuit or unit of network node 500 (e.g. eNB) together with a computer program code for performing the functions and/or method steps of the embodiments. For example, a computer program comprising instructions which, when executed on at least one processor, cause the at least one processor to carry out the method performed by the network node 500 as described earlier and in conjunction with FIG. 4 and presented in the appended claims relating to the method for the network node 500. Also here a carrier containing the computer program is provided, wherein the carrier is one of an electronic signal, optical signal, a radio signal or a computer readable storage medium. The network node 300 may comprise additional units/circuits/modules which are not shown, e.g. an antenna, an input device(s) circuit/unit, an output device(s) circuit/unit, interfaces and a bus etc.

The various "circuits" or "units" or "modules" described may refer to a combination of analog and digital circuits, and/or one or more processors configured with software and/or firmware (e.g., stored in memory). One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Resources or communication resources or radio resources may generally be frequency and/or time resources (which may be called time/frequency resources). A resource may be a PRB (Physical Resource Block) and/or comprise more than one PRB. A PRB may be identified and/or comprise a combination of time/frequency resources, which may combine to a PRB as smallest defined resource unit (in particular time/frequency resource unit). Resources, in particular configured or scheduled resources, may be frequency-related, in particular regarding one or more carriers and/or subcarriers, and/or time-related, in particular regarding frames and/or slots and/or subframes and/or mini-slots, and/or pertain to resource blocks and/or time/frequency hopping, in particular pertaining to transmission or reception, e.g. by a wireless device.

Transmission from UE may generally be referred to as uplink (UL) transmission, in particular if targeted at the network or network node. Transmission to a UE may generally be referred to as downlink (DL) transmission, in particular if originating from a network or network node. For direct communication between wireless devices (D2D communication), resources (e.g. frequency resources) usually used for UL or DL may be used, wherein UL resources may be preferred. An uplink resource may be a resource configured or scheduled for UL transmission. A DL resource may be a resource scheduled for DL transmission (or, from the wireless device's point of view, for reception.

Transmitting using resources (e.g., by a UE an/or a network node) may comprise transmitting data and/or retransmission feedback on these resources, e.g. on the frequency and/or subcarrier and/or carrier and/or timeslots and/or subframes and/or symbols and/or slots and/or mini-slots of the resources.

A transmission occasion may generally be any resource configured and/or scheduled for transmission, in particular for transmission by the UE. A transmission occasion may in particular refer to a time-resource (unit or interval) or frequency resource or time-frequency resource, which may be pre-defined by a standard. A transmission occasion may comprise and/or cover and/or be e.g. a symbol, slot, subframe, mini-slot, set or group of PRBs or symbols or slots or subframes, one or more channels, in particular physical channels. A transmission occasion may comprise one or more of the corresponding time intervals and/or frequency resources, e.g. carrier or subcarriers.

Receiving using resources (e.g., by a UE) may comprise receiving data on these resources, e.g. on the frequency and/or subcarrier and/or carrier and/or timeslots and/or subframes and/or symbols and/or slots and/or mini-slots of the resources. In particular, a received data may pertain to receiving data, using resources.

A time indication of a received data may pertain to, and/or be based on, e.g a sequence number and/or starting time instance and/or a time duration and/or ending time instance of the DL time resource that was used for transmitting the data and/or the time resource that was used for receiving the data.

A time indication may represent:
a reception timing of DL data in a UE and/or
a transmission timing of DL data from a network node A retransmission feedback relating to a received data, may comprise and/or be an HARQ ACK or HARQ NACK to the received data.

"Receiving on"- and "receiving using" ime frequency resources may be used interchangeably in this disclosure. In analogy, "transmitting on"- and "transmitting using" time frequency resources may also be used interchangeably in this disclosure.

DL HARQ feedback reported at end of same slot will now be discussed

Multiple terminals (e.g. UEs) may be scheduled in a time resource (e.g. a slot) and may transmit retransmission feedback (e.g. DL HARQ feedback) at the end of the same time resource (e.g. slot) as illustrated in FIG. 12. Terminals in the same slot can either be separated using FDM or spatially (MU-MIMO). To avoid collisions in UL resources when transmitting retransmission feedback, a mechanism is needed to assign non-colliding UL resources to the different feedback transmissions.

Without spatial multiplexing of control channels, the control channels containing e.g. DL assignments may occupy different frequency resources and/or time resources (e.g. OFDM symbols). One possibility may be to derive the UL feedback resources from the time-frequency resources used by the scheduling DL control channel. An additional mechanism may be anticipated when considering collision resolution from spatially multiplexed DL assignments using same time-frequency control channel resources as is done e.g. when transmitting using beamforming to enable spatial multiplexing of control channels.

Alternatively, UL time-frequency resources to use for retransmission feedback may be derived from a frequency allocation of the corresponding DL data channel. As described above, deriving UL resources from DL control channel resources is an additional and/or alternative option. Since a number of users reusing same and/or overlapping time-frequency resources is typically larger for a user data channel than for a control channel (typically carrying control information associated with the user data), deriving UL time-frequency resources to use for retransmission feedback from DL control channel resources may therefore be preferable since the mechanism to resolve resource conflicts can therefore be simpler.

DL HARQ feedback from multiple slots reported in one slot will now be described

Not all terminals are assumed to be capable of reporting DL HARQ feedback and/or transmitting retransmission feedback, at the end of a same time resource (such as a slot) as in which a corresponding data packet was received. DL HARQ feedback relating to multiple slots may therefore be reported in one slot.

Even for terminals that support DL HARQ feedback in the same slot it may be beneficial to use a later slot for feedback. One example could be the scheduling pattern shown in FIG. 13, which illustrates a scenario when DL HARQ feedback related to transmissions of data packets in several slots, are reported in one slot In this scenario four DL transmissions are scheduled but the network does not request feedback until the end of the third slot to avoid frequent DL/UL switches. The concept in this disclosure is can be used to resolve UL resource conflicts from DL transmissions scheduled in different slots.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation.

The invention claimed is:

1. A method of operating a user equipment (UE), the method comprising:
   receiving data on a downlink (DL) time-frequency resource; and
   transmitting, on an uplink (UL) time-frequency resource, retransmission feedback to indicate whether a data packet comprised in the data was received properly, wherein the frequency resource of the UL time-frequency resource is determined based on where in time, within a time-slot structure, the data was received.

2. The method of claim 1, wherein the data comprises a control information associated with the data packet and wherein the data packet is received using a first part of the DL time-frequency resource and the control information is received on a second part of the DL time-frequency resource.

3. The method of claim 2, wherein the UL time-frequency resource is determined based on the second part of the DL time-frequency resource.

4. The method of claim 2, wherein the UL time-frequency resource is determined based on the first part of the DL time-frequency resource.

5. The method of claim 1, wherein the UL time-frequency resource and the DL time-frequency resource are overlapping in time.

6. A method of operating a network node, the method comprises:
   transmitting data on a Downlink (DL) time-frequency resource, to a User Equipment (UE); and
   receiving, on an Uplink (UL) time-frequency resource, retransmission feedback indicating whether a data packet comprised in the data was received properly by the UE, wherein the frequency resource of the UL time-frequency resource is determined based on where in time, within a time-slot structure, the data was received.

7. The method of claim 6, wherein the data comprises control information associated with the data packet and wherein the data packet is transmitted using a first part of the DL time-frequency resource and the control information is transmitted on a second part of the DL time-frequency resource.

8. The method of claim 7, wherein the UL time-frequency resource is determined based on the second part of the DL time-frequency resource.

9. The method of claim 6, wherein the UL time-frequency resource and the DL time-frequency resource are overlapping in time.

10. A user equipment (UE) comprising one or more processors and a memory, said memory containing instructions executable by said one or more processors, whereby said UE is operative to:
   receive data on a downlink (DL) time-frequency resource; and
   transmit, on an uplink (UL) time-frequency resource, retransmission feedback to indicate whether a data packet comprised in the data was received properly, wherein the frequency resource of the UL time-frequency resource is determined based on where in time, within a time-slot structure, the data was received.

11. The UE of claim 10, wherein the data comprises control information associated with the data packet and wherein the data packet is received using a first part of the DL time-frequency resource and the control information is received on a second part of the DL time-frequency resource.

12. The UE of claim 11, wherein the UL time-frequency resource is determined based on the second part of the DL time-frequency resource.

13. The UE of claim 11, wherein the UL time-frequency resource is determined based on the first part of the DL time-frequency resource.

14. The UE of claim 10, wherein the UL time-frequency resource and the DL time-frequency resource are overlapping in time.

15. A network node, comprising one or more processors and a memory, said memory containing instructions executable by said one or more processors whereby said network node is operative to:
   transmit data on a downlink (DL) time-frequency resource to a user equipment (UE); and
   receive, on an uplink (UL) time-frequency resource, a retransmission feedback indicating whether a data packet comprised in the data was received properly by the UE, wherein the frequency resource of the UL time-frequency resource is determined based on where in time, within a time-slot structure, the data was received.

16. The network node of claim 15, wherein the data comprises control information associated with the data packet and wherein the data packet is transmitted using a first part of the DL time-frequency resource and the control information is transmitted on a second part of the DL time-frequency resource.

17. The network node of claim 16, wherein the UL time-frequency resource is determined based on the second part of the DL time-frequency resource.

18. The network node of claim 15, wherein the UL time-frequency resource and the DL time-frequency resource are overlapping in time.

* * * * *